United States Patent [19]

Lenderman

[11] 3,973,436

[45] Aug. 10, 1976

[54] TIRE-INFLATION APPRAISAL APPARATUS

[76] Inventor: Gerald H. Lenderman, Box 354, Seattle, Wash. 98936

[22] Filed: Nov. 17, 1975

[21] Appl. No.: 632,639

[52] U.S. Cl. .............................................. 73/146.2
[51] Int. Cl.² ...................................... B60C 23/06
[58] Field of Search ................ 73/146, 146.2, 146.3

[56] References Cited
UNITED STATES PATENTS
2,313,156  3/1943  Kratt, Jr. .............................. 73/146

Primary Examiner—Donald O. Woodiel

[57] ABSTRACT

This is an apparatus for receiving an inflated pneumatic vehicle tire while the tire is mounted on a vehicle. The apparatus includes pressers and levers which facilitate the visual appraisal of the road-engagement pattern across the tire tread in aid of quickly determining the inflation and other characteristics of the tire.

5 Claims, 5 Drawing Figures

U.S. Patent  Aug. 10, 1976  3,973,436
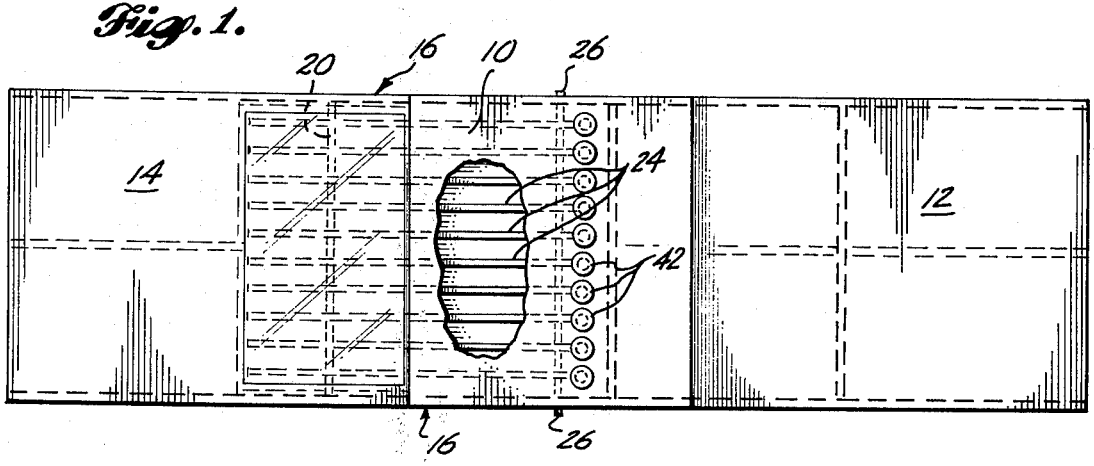
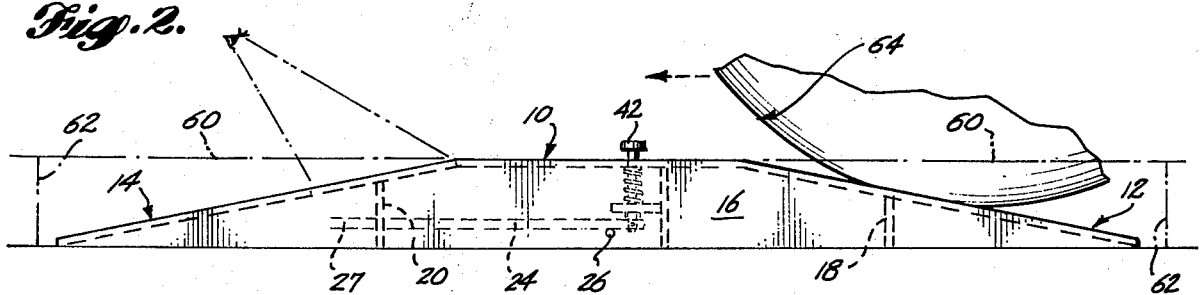
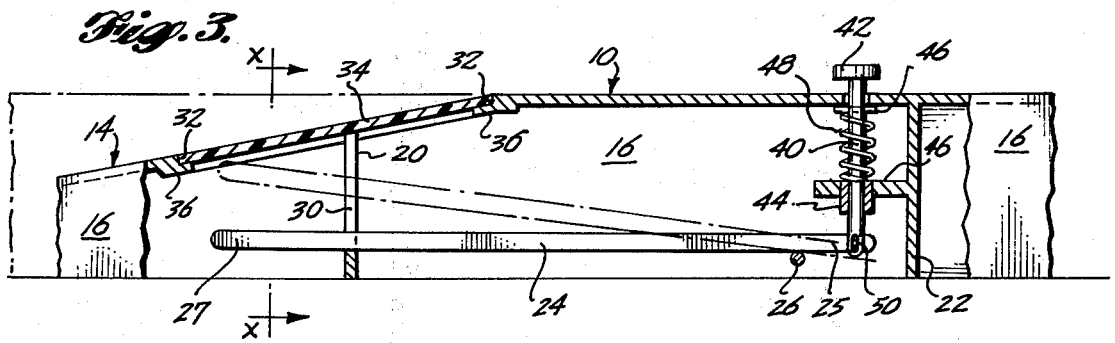
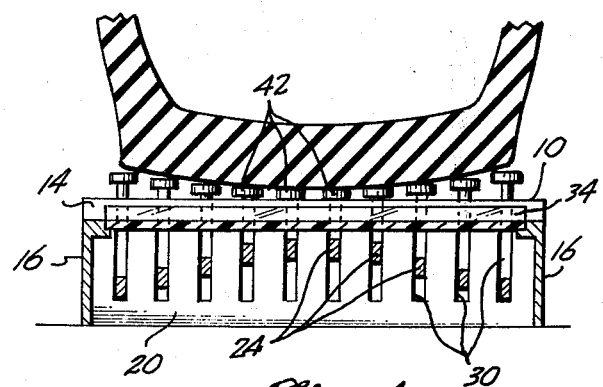
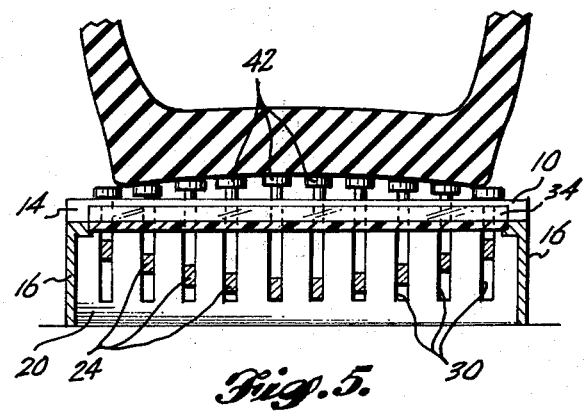

TIRE-INFLATION APPRAISAL APPARATUS

BACKGROUND OF THE INVENTION

Owners of vehicles borne on pneumatic tires should show major concern that proper pressures are maintained in the tires in order to obtain and achieve optimum conditions for safety, road-hugging and handling characteristics and for longer wearing quality. An under-inflated tire primarily bears its load at the shoulders of the tread, in which case its road-engagement pattern is somewhat concave between those shoulders. Under such conditions continued use of the tire over the road causes excessive wear at the shoulders, because an appropriate frictional contact in the central portion is not maintained. This results in less-than-normal and obviously uneven wear. Alternatively, an over-inflated tire sustains considerable wear in the central tread area between the shoulders, which produces less-than-normal wear at the shoulder portions. In either situation the total possible road engagement contact at that portion of the tread that is bearing on the road surface results in wastefulness, since the total potential of the tire is not being obtained. In some instances, there is a greater tendency to skid or slide. In addition, undue stresses and strains, particularly in the instance of under-inflation, are applied to the sidewalls of the tire carcass, causing it to deteriorate before its time.

Tire manufacturers provide specifications for the operation of tires. Automobile manufacturers also specify tire inflation characteristics. However, both of these specifications, even if followed religiously, do not necessarily mean that the tire-operating condition is particularly correct for that tire on that vehicle. The ideal conditions, therefore, will be seen to exist when the air pressure in the particular tire is just sufficient to produce full road-engagement contact across the entire width of the tread, so that the weight of the car is borne equally in the road-engagement area between the shoulders and across the central portion of the tire. Under such circumstances the tire tread will wear evenly, and the tread life and maximum safety results from maximum gripping or friction of the tire on the roadway.

In the past vehicle operators or gas station attendants have to some degree relied on visual inspection of the tire under a load to appraise inflation. A tire wearing too much at the shoulders becomes bald therearound due to the under-inflation of the tire. However, when the bald condition is visible or observable, it may already be too late to do much to rectify the situation. Contrariwise, the over-inflated tire bears the load in the mid-portion of the tread where wear rapidly occurs due to the fact that the share of the load being borne by the particular tire is distributed over two small a central road-engagement area at the tread, whereupon a bald strip soon appears around the casing. When such a situation is to be appraised visually, there is likely to have been such excessive mid-tread wear that the casing may have nearly lived out its operating life. Of course, such determinations are affected by differences in the load borne by a tire. For example, where a vehicle is operated normally with a driver and one passenger, one condition exists. When it is caused to bear two or three extra passengers and, possibly, luggage and other loads, the conditions change markedly, and an adjustment in tire pressure should be made.

SUMMARY OF THE INVENTION

Among the primary objects of this invention to overcome the disadvantages and problems mentioned in the BACKGROUND statement is to provide apparatus which will enable vehicle operators or their attendants as well as safety and law enforcement agencies to quickly determine visually whether pneumatic vehicular tires are properly inflated, both for safety and for economic operating purposes.

In carrying out this invention, there has been provided a treadway beneath which and in alignment with which is a plurality of parallel elongated levers. A common-axis fulcrum transverse the treadway is disposed beneath the levers. Means is provided in the form of upstanding depressible pins operable to press upon each of the levers while under load to cause the levers at a remote point to assume a disposition which translates in a magnified or amplified form the actual conditions of the tire tread at its point of contact with the roadway or treadway. It is arranged that these levers at their thus disposed ends are visible, so that an examination will quickly and quite accurately enable a viewer to appraise the condition of a tire.

Other advantages and objects of the invention will become more apparent from a review of the following description taken in connection with the accompanying drawings.

IN THE DRAWINGS

FIG. 1 is a plan view of apparatus for appraising the road engagement pattern of a vehicular tire;

FIG. 2 is a side view of a preferred form of the apparatus;

FIG. 3 is an enlarged, partially sectioned side view of the apparatus of FIG. 2 with portions broken away for convenience of illustration;

FIGS. 4 and 5 are cross-sectional views taken in the plane x—x of FIG. 3 illustrating road engagement patterns and how they are appraised.

DETAILED DESCRIPTION

In the preferred form of the apparatus treadway 10 has contiguous ramps 12 and 14 and is supported relative a base or floor by side walls 16, 16. Transverse internal walls 18, 20 and 22 at their ends join the side walls and at their upper edges join the underside of the treadway and ramps. It is desirable that the described structure be integrated strongly, as by comprising a weldment or by being cast by well known techniques.

A plurality of parallel elongated levers 24 is disposed beneath the treadway 10 in alignment therewith, i.e., disposed in the direction of the path a tire rolled onto the treadway. Levers 24 rest near their first ends 25 on the fulcrum bar 26 disposed transversely thereunder as best seen in FIG. 3. Bar 26 is mounted at its ends in side walls 16, 16. The other or opposite ends 27 of levers 24 extend through guide slots 30 in wall 20. Preferably, lever ends 27 extend a distance from fulcrum 26 several times the extension of ends 25 from fulcrum axis 26.

A window opening 32 is located in treadway ramp 14 in overlying relation to said other ends 27 of levers 24. A transparent pane 34 may be supported in opening 32 by window edge flanges 36 and in part by resting on the upper edge of wall 20.

Near the first ends 25 of levers 24 is located a series of upstanding pins 40 in vertical guides 44 in ledge 46.

The upper ends of pins 40 have heads 42. A cross pin 46 through each pin 40 presses upon spring 48 which encircles the pin 40 and bears upon ledge 46. When head 42 and pin 40 are released after being depressed, the spring 48 returns the head to its upward position. The lower ends of pins 40 are bifurcated to straddle the first ends 25 of levers 24 to which they are coupled by pivot pins 50.

While there is shown herein the treadway 10 being disposed between ramps 12 and 14, it will be understood that the treadway may be flush with a floor indicated by dash-dot line 60 in FIGS. 2 and 3. In such instance, of course, the levers, their fulcrum, and guide and operation means would be disposed in a recess or pocket 62 in the floor.

OPERATION OF THE APPARATUS

When a tire tread 62 is disposed on the transverse array of buttons or pin heads 42 in treadway 10 the pins 40 are depressed, causing levers 24 to tilt relative fulcrum axis 26. The first ends 25 go down and the other ends 27 rise in slots 30. When a tire is so inflated that its tread 62 is convex, as shown in FIG. 4, the medial pins 40 will be depressed more than those pins at the shoulders of the tire tread. This results in the lever ends 27 displaying a convex disposition when viewed through window 32.

Conversely, when a tire is inflated less than is desirable, the tread 62 will have the concave situation shown in FIG. 5. Thus, when such a tire is disposed over the series of upstanding pins 40 in treadway 10, the medial pins will be less depressed than those at the shoulders of the tire tread. As a result, the lever ends 27, when viewed through window 32, will display a concave disposition.

The extra lengths of lever ends 27 in relation to fulcrum axis 26 vis-a-vis the length of lever ends 25 results in a visual amplification of the degree of concavity or convexity to tire tread 62 sensed by the depressed pins 40. In other words, the depression of pins 40 may be a slight fraction of an inch, whereas the rise of the longer viewed lever ends will be greater and easily detected by the operator.

Of course, a properly inflated tire having a transversely flat tread will show such condition by only causing all lever ends 27 to rise alike and be disposed in a flat plane.

In compliance with the statute, the invention has been described in language more or less specific as to structural features. It is to be understood, however, that the invention is not limited to the specific features shown, since the means and construction herein disclosed comprises a preferred form of putting the invention into effect. The invention is, therefore, claimed in any of its forms or modifications within the legitimate and valid scope of the appended claims, appropriately interpreted in accordance with the doctrine of equivalents.

What is claimed is:

1. Apparatus for appraising the road engagement pattern of a pneumatic vehicular tire while mounted on a vehicle, comprising:
    means providing a treadway;
    a plurality of parallel elongated levers disposed beneath said treadway in alignment therewith;
    means forming a common axis fulcrum transverse said treadway for said levers, said axis being located proximate the first ends of said levers, a minor fraction of the distance of said axis to the other ends of said levers;
    an upstanding depressible pin operably associated with each lever first end and extending through and above said treadway; and
    said treadway, including means providing a window located to permit viewing of the other ends of said levers while a tire is standing on said upstanding pins to permit appraisal of the road engagement patterns of such tire.

2. The apparatus of claim 1 in which the upstanding pins are spring biased upward.

3. The apparatus according to claim 2 in which each upstanding pin is pivotally coupled to its associated lever first end.

4. The apparatus according to claim 1 in which the treadway is disposed in spaced relation above a supporting surface, and ramps are provided at each end of the treadway.

5. Apparatus for appraising the road engagement pattern of the tread of a vehicular tire while mounted on a vehicle, comprising:
    means for guidingly supporting a plurality of depressible pins disposed in a row transverse the tread of a vehicle tire to be appraised;
    a first end of each of a series of elongated levers depressibly associated with a lower end of one of said pins;
    means forming a common transverse fulcrum for said series of elongated levers in spaced relation to their associations with said depressible pins;
    the other ends of said levers extending oppositely from said transverse fulcrum a distance several times the spacing between said common fulcrum and the lower ends of said buttons; and
    means providing a window disposed to permit viewing of said other ends of said elongated levers while the road engaging tread of the tire is standing on said plurality of buttons.

* * * * *